United States Patent

[11] 3,617,403

| [72] | Inventor | Duane M. Johnson |
| | | Bicknell, Ind. |
| [21] | Appl. No. | 819,523 |
| [22] | Filed | Apr. 24, 1969 |
| [45] | Patented | Nov. 2, 1971 |
| [73] | Assignee | The United States of America as represented by the Secretary of the Navy |

[54] IGNITION TRANSFER COMPOSITION COMPRISING FUEL, OXIDIZER AND FLUOROELASTOMER
2 Claims, No Drawings

| [52] | U.S. Cl. | 149/19, 149/22, 149/44 |
| [51] | Int. Cl. | C06d 5/00 |
| [50] | Field of Search | 149/19, 22, 44 |

[56] References Cited
UNITED STATES PATENTS

| 3,286,628 | 11/1966 | Young et al. | 149/22 X |
| 3,317,362 | 5/1967 | Doris et al. | 149/44 X |
| 3,519,505 | 7/1970 | Gardner | 149/19 |

OTHER REFERENCES

Brydson, "Plastic Materials," pp. 216–217, D. Van Nostrand Company, Inc., (1966), Princeton, N.J. (Sci. Lib. TP 1120 B7)

*Primary Examiner*—Carl D. Quarforth
*Assistant Examiner*—E. A. Miller
*Attorneys*—Edgar J. Brower, H. H. Losche and Paul S. Collignon

ABSTRACT: A transfer composition for igniting a pyrotechnic composition comprised of a fuel such as boron, an oxidizer, such as lead dioxide, and a fluoroelastomer which serves as a binder and desensitizer.

IGNITION TRANSFER COMPOSITION COMPRISING FUEL, OXIDIZER AND FLUOROELASTOMER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Various types of transfer or igniter compositions are used in the pyrotechnic art to transfer combustion from an initiator, such as a primer, squib, or detonator, to a pyrotechnic composition such as propelling powder, flare composition, or the like. For example, in U.S. Pat. No. 3,173,367, issued Mar. 16, 1965, to Roy L. Shinpaugh, there is disclosed an ignition composition comprised of between 65–78 percent of barium chromate, between 7–16 percent of boron, and between 10–20 percent of lead dioxide. This composition is designed to have improved dielectric resistance and to be substantially insensitive to a wide range of temperature conditions.

Previously available transfer compositions which are highly ignition-sensitive, are also highly friction sensitive and difficult to handle during manufacture. In addition, these transfer compositions are not very durable and are adversely affected by shock and vibration. Pressed columns of these compositions tend to crack or powder and then become unreliable.

SUMMARY OF THE INVENTION

The improved transfer composition of the present invention is comprised of between 3 and 12 percent of a fuel, such as boron, between 80 and 95 percent of an oxidizer, such as lead dioxide and between 2 and 12 percent of a fluoroelastomer which serves as a binder and desensitizer. The transfer composition may be used in the loose form when extreme ignition sensitivity is desired, or it may be extruded or consolidated under pressure.

DESCRIPTION OF THE PREFERRED EMBODIMENT

Various transfer compositions were prepared using boron, lead dioxide, and a fluoroelastomer. The proportions, by weight, ranged between 3 to 12 percent boron, between 80 to 95 percent lead dioxide, and between 2 to 12 percent of a fluoroelastomer known as Viton A, a polymer of 32.1 percent carbon, 1.8 percent hydrogen, and 66.1 percent fluorine. Viton A, which is shown as $(-CF_2CH_2CF_2)_x$ is sold by E. I, duPont deNemours, Wilmington, Delaware.

The transfer composition is prepared by adding the fuel and oxidizer to an acetone solution of Viton A. The ingredients are mixed by agitation until a homogeneous mixture is obtained. While agitation is in process, hexane is added in the ratio of two volumes of hexane per volume of solution. The binder precipitates out of solution onto the solid particles of fuel and oxidizer. Agitation is then stopped and the solids are allowed to settle. The hexane-acetone solution is then decanted off. Additional hexane is then added and the solids are again agitated. The hexane is decanted off and the solids allowed to flash-dry. The composition may be used in the loose form when extreme ignition sensitivity is desired, or it may be extruded or consolidated under pressure.

The following nonlimiting examples represent embodiments of the invention which were compounded and satisfactorily tested at the Naval Ammunition Depot, Crane, Ind. The percentages listed are by weight.

| Example Number | Fuel (%) | Oxidizer (%) | Binder (%) |
| --- | --- | --- | --- |
| 1. | Boron—9.6 | Red lead dioxide—86.4 | Viton A—4 |
| 2. | Boron—8.6 | Lead dioxide 87.1 | Viton A—4.3 |
| 3. | Boron—6.6 | Lead dioxide—89.1 | Viton A—4.3 |
| 4. | Boron—4.8 | Lead dioxide—90.9 | Viton A—4.3 |
| 5. | Boron—5.7 | Red lead oxide—90.0 | Viton A—4.3 |
| 6. | Boron—19.2 | Manganese dioxide—76.8 | Viton A—4.0 |
| 7. | Silicon—9.6 | Lead dioxide—86.4 | Viton A—4.0 |
| 8. | Silicon—17.3 | Lead dioxide—78.7 | Viton A—4.0 |
| 9. | (Boron—3.8) (Silicon—5.7) | (Lead dioxide—19.2) (Manganese dioxide—67.3) | Viton A—4.0 |

I claim:

1. An ignition transfer composition comprised, by weight, of,
   between about 3 and 12 percent of a fuel selected from the group consisting of boron and silicon,
   between about 80 and 95 percent of an oxidizer selected from the group consisting of lead dioxide, red lead oxide and manganese dioxide, and
   between about 2 and 12 percent of a fluoroelastomer having the formula $(-CF_2CH_2CF_2)_x$, and comprised, by weight, of about 32.1 percent carbon, about 1.8 percent hydrogen and about 66.1 percent fluorine.

2. An ignition transfer composition as set forth in claim 4 wherein said fuel is boron and said oxidizer is lead dioxide.

* * * * *